H. Pietsch,
Water Cooler.
No 85,125.  Patented Dec. 22, 1868.
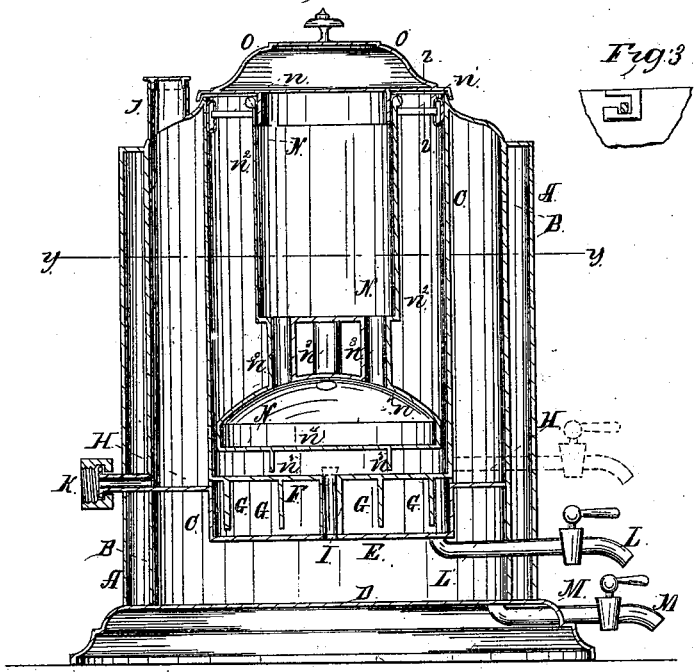
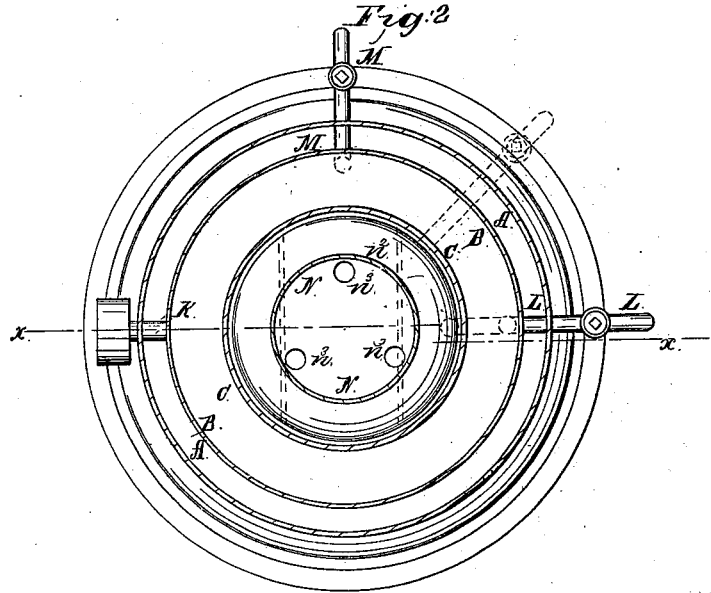
Witnesses:
Chas. Nida
Wm O. Morgan
Inventor:
H. Pietsch
per Munn & Co.
Attorneys

HERMAN PIETSCH, OF NEW YORK, N. Y.

Letters Patent No. 85,125, dated December 22, 1868.

IMPROVED COOLER FOR WATER, MILK, AND OTHER LIQUIDS.

The Schedule referred to in these Letters Patent and making part of the same.

*To all whom it may concern:*

Be it known that I, HERMAN PIETSCH, of the city, county, and State of New York, have invented a new and improved Cooler for Water, Milk, &c.; and I do hereby declare that the following is a full, clear, and exact description thereof, which will enable others skilled in the art to make and use the same, reference being had to the accompanying drawings, forming part of this specification.

Figure 1 is a vertical section of my improved cooler, taken through the line $x\,x$, fig. 2.

Figure 2 is a horizontal section of the same, taken through the line $y\,y$, fig. 1.

Figure 3 is a detail sectional view, taken through the line $z\,z$, fig. 1.

Similar letters of reference indicate corresponding parts.

My invention has for its object to furnish a simple and convenient cooler for water, milk, &c, and which may, at the same time, be used as a refrigerator when required; and It consists in the construction and combination of the various parts of the cooler, as hereinafter more fully described.

The body of the cooler is formed of three concentric walls, A, B, and C.

The two outer walls, A and B, extend from the bottom to the top of the cooler, and the space between them is filled with powdered charcoal or some other suitable non-conducting material.

The space between the inner wall C and the middle wall B should be greater than that between the walls A and B, so as to form a receptacle of sufficient capacity to contain the water to be cooled.

The inner wall C does not extend to the bottom, D, as shown in fig. 1, and is provided with two bottoms, E and F, at a short distance from each other.

The upper bottom, F, is provided with flanges G, projecting downward nearly to the bottom, E, leaving only space between their lower edges and the bottom, E, for the free passage of the water to be cooled.

The space between the walls B and C is also provided with a bottom, H, which is placed a little lower than the bottom, F, so as to leave space for openings in the wall C, between the bottom, F, and the bottom, H, for the passage of the water to be cooled from the space between the walls B and C to the space between the bottoms E and F.

The space within the wall C is designed to receive the ice, the waste water from which passes down through the pipe I to the space below the bottoms E and H, which said space is designed to be of such a size as to contain all the water formed by the melting of all the ice that can be put into the space within the wall C above the bottom, F.

The water to be cooled may be introduced through the short pipe J in the top of the cooler, or the cooler may be connected with a water-pipe by means of the short pipe K, leading in through the walls A B, as shown in figs. 1 and 2.

The cooled water is drawn out from the space between the bottoms E and F, through the pipe L, and the waste water formed from the melting ice is drawn out through the pipe M.

The pipes L and M are provided with stop-cocks in the ordinary manner.

When the cooler is to be used for cooling milk and similar substances, the milk or other substance to be cooled is placed in the space within the inner wall C, and when cooled or required for use, is drawn off through a pipe leading out from the said space or chamber just above the bottom, F, as shown in red lines in figs. 1 and 2. In this case, the upper orifice of the pipe I should be closed with a cork or other secure and easily-detachable stopper, as is also shown in red lines in fig. 1. In this case, the ice is placed in the receiver N, which is removably secured to the inner wall C, by means of the arms or pins $n^1$, attached to the body $n^2$ of the receiver N. From the bottom of the body $n^2$ of the receiver, three pipes, $n^3$, lead into the receptacle $n^4$, connected with the said body $n^2$ by the said pipes $n^3$. The receptacle $n^4$ is provided with flanges $n^5$, projecting downward from its bottom, as shown in fig. 1.

The object of the flanges G and $n^5$ is to present a greater cooling-surface to the liquids to be cooled. When the ice in the receiver N has become melted, the waste water may be poured out by removing the said receiver N; or if the cooled liquids have first been drawn off, the waste water may be poured out by inverting the entire cooler.

O is a removable cap or cover, covering the space within the wall C, and which is also provided with a downwardly-projecting flange fitting into the mouth of the receiver N, as shown in fig. 1.

Having thus described my invention,

I claim as new, and desire to secure by Letters Patent—

1. The combination of the walls A B C, bottoms D, E, F, and H, flanges G, pipe I, pipes L M, provided with stop-cocks and ingress-pipes J K, either or both with each other, said parts being constructed and arranged substantially as herein shown and described, and for the purposes set forth.

2. The receiver N $n^1$ $n^2$ $n^3$ $n^4$ $n^5$, constructed substantially as herein shown and described, in combination with the cooler A B C D E F G H, and for the purposes set forth.

3. The ice-receiver N, formed by the combination of the body $n^2$, pipes $n^3$, receptacle $n^4$, and flanges $n^5$ with each other, substantially as herein shown and described, and for the purpose set forth.

4. The formation, in a cooler, of a small space or chamber, between the ice-chamber and the waste-water chamber, said space or chamber being provided with flanges G, substantially as herein shown and described, and for the purpose set forth.

The above specification of my invention signed by me, this 31st day of October, 1868.

HERMAN PIETSCH.

Witnesses:
E. GREENE COLLINS,
JAMES T. GRAHAM.